No. 765,381. PATENTED JULY 19, 1904.
C. F. FLEMING.
FRUIT PROCESSING DEVICE.
APPLICATION FILED SEPT. 2, 1903.
NO MODEL.
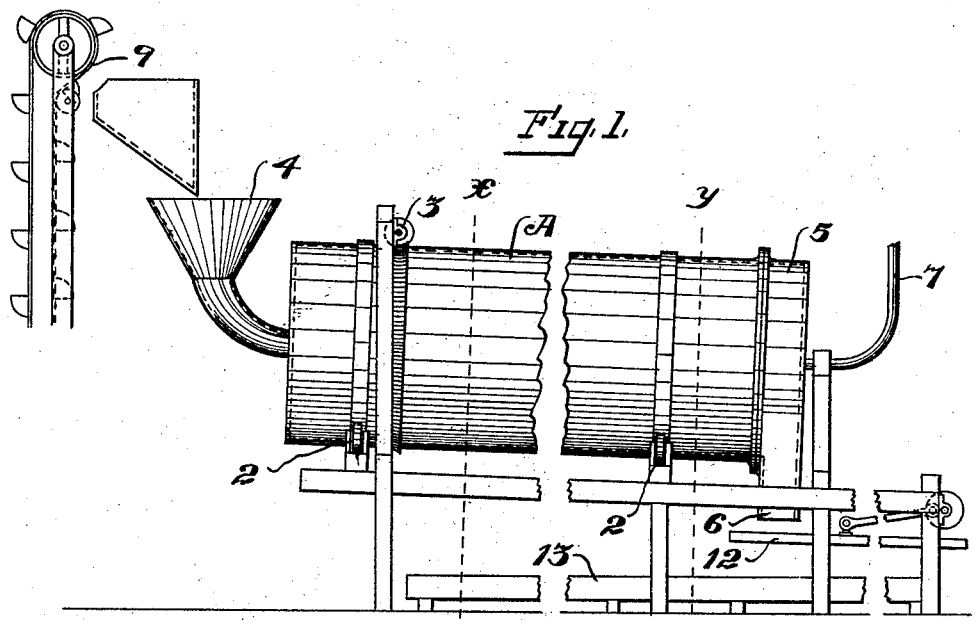
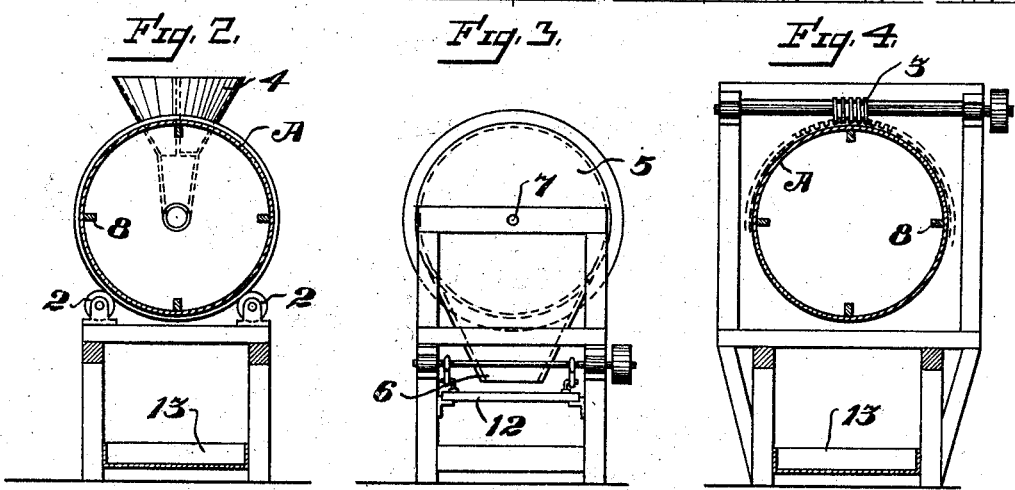
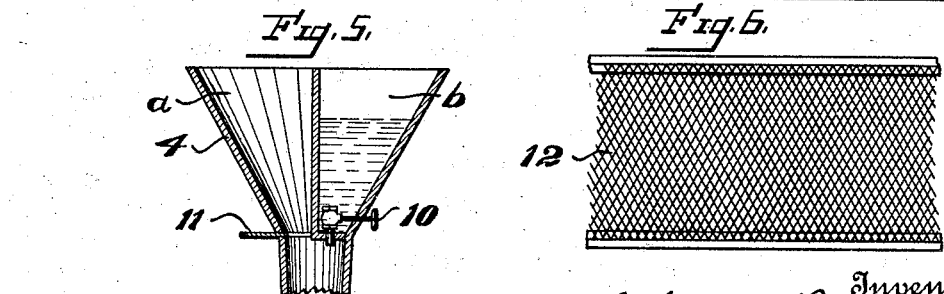
Witnesses:
Inventor,
Charles F. Fleming
Geo. H. Strong No. 765,381. Patented July 19, 1904.

UNITED STATES PATENT OFFICE.

CHARLES F. FLEMING, OF SAN JOSE, CALIFORNIA.

FRUIT-PROCESSING DEVICE.

SPECIFICATION forming part of Letters Patent No. 765,381, dated July 19, 1904.

Application filed September 2, 1903. Serial No. 171,619. (No model.)

*To all whom it may concern:*

Be it known that I, CHARLES F. FLEMING, a citizen of the United States, residing at San Jose, in the county of Santa Clara and State of California, have invented new and useful Improvements in Fruit-Processing Devices, of which the following is a specification.

My invention relates to a device which is especially designed for the treatment of dried fruits preparatory to being packed and which device is known in the art as a "processer."

In consists of the parts and the construction and combination of parts, as hereinafter more fully described, having reference to the accompanying drawings, in which—

Figure 1 is a side elevation of my invention. Fig. 2 is a vertical transverse section on line $y$, Fig. 1. Fig. 3 is a view of discharge end. Fig. 4 is a vertical transverse section on line $x$, Fig. 1. Fig. 5 is a cross-section of feed-hopper. Fig. 6 is a partial plan of perforated shaker.

A represents an inclined cylinder supported on roller-bearings, as 2, and suitably driven by worm-gear or equivalent mechanism, as indicated at 3. The upper or feed end of the cylinder is closed, except for a central opening through which the fruit to be processed is delivered from hopper 4. The lower flanged end of the cylinder is open and abuts against and has a snug running-joint with the flanged open end of a stationary section 5, having a discharge-opening 6 in its under side. The section 5 is, in effect, an inverted hopper, with its inner walls practically continuous with the inner walls of the cylinder.

Steam is admitted at the lower end of the apparatus through a pipe 7. The cylinder is preferably jacketed to reduce condensation within.

The inner periphery of the cylinder is provided with an annular series of longitudinal baffles or lifters 8, by which the fruit as the cylinder is slowly revolved is continually lifted and dropped back into the cylinder and the juices and moisture by condensation poured back over the fruit again and again.

Where the dried fruit to be processed is very dry or hard and lusterless, it is often desired to add a certain amount of water to it to soften it or brighten it up or increase its weight. This machine is designed to spray the fruit simultaneously with its admission through the hopper into the cylinder. Accordingly the hopper is divided into two compartments $a$ $b$, the latter adapted as a water-containing reservoir. The fruit is fed into the first one by any suitable means, as an endless conveyer 9, and such fruit as is deemed insufficient in moisture is treated to a water application from compartment $b$, the flow therefrom being regulated by a suitable valve 10. The feed of fruit to the cylinder may be completely cut off by a gate 11.

The feed of the fruit and the admission of the steam to the cylinder may proceed continuously and simultaneously with the rotation of the cylinder, which, with the lifters 8, causes the fruit to be continually turned, raised, and dropped, and the juices and moisture from condensation will all be mixed and poured over the fruit during its passage through the cylinder, this added liquid serving to soften or brighten the fruit in cases where it is desirable and to give it a certain luster which it would otherwise lack. The fruit arriving at the discharge-opening 6 at the lower end of the cylinder is deposited upon a shaker 12, having a perforated surface. The movements of this shaker will cause any excess juices or moisture to drip through into a tank 13 below, while the now sterilized fruit is delivered from the end of the shaker upon suitable conveyers, whence it is carried to the packers or otherwise disposed of, as desired.

This apparatus is of especial value in the processing of very soft fruit which cannot stand the treatment of the ordinary dippers running in hot water or other liquid. Here the steam may be admitted very hot, and by cutting off the water-supply from compartment $b$ of the feed-hopper and revolving the cylinder very slowly the sterilization process may be prolonged, being practically a dry process.

Having thus described my invention, what I claim, and desire to secure by Letters Patent, is—

1. The combination in an apparatus for treating dried fruits and the like, of an inclined cylinder, mechanism by which said cylinder is supported and rotated, a two-part hopper connecting with the upper end of the cylinder, said hopper containing fruit and liquid, gates by which either or both may be admitted to the cylinder, and a steam-pipe opening into the lower end of the cylinder adjacent the discharge.

2. The combination in an apparatus for processing dried fruit and the like, of an inclined, closed, jacketed, revoluble cylinder, a two-part hopper, means for feeding fruit and liquid therefrom into the upper end of the cylinder, a pipe through which steam is admitted into the lower end of the cylinder, a discharge-opening adjacent the lower end of the cylinder, a shaking perforated receiving-table located below the discharge and a tank below the table to receive the separated liquid.

3. The combination in an apparatus for processing fruit of a revoluble inclined cylinder, a feed-hopper entering centrally of the upper head of the cylinder, a stationary cylindrical section coaxial with the cylinder and against which the lower open end of the latter abuts and into which it discharges, said section having its outer end closed and having a discharge-opening in its under side, and a shaking-table below said discharge-opening and receiving the fruit therefrom.

In testimony whereof I have hereunto set my hand in presence of two subscribing witnesses.

CHARLES F. FLEMING.

Witnesses:
F. L. BURRELL,
W. H. STACY.